US012583766B2

(12) United States Patent
Lal et al.

(10) Patent No.: US 12,583,766 B2
(45) Date of Patent: Mar. 24, 2026

(54) ACTIVATED CARBON-CEMENT COMPOSITE COATED POLYURETHANE FOAM BASED SOLAR THERMAL EVAPORATOR

(71) Applicant: Amrita Vishwa Vidyapeetham, Tamil Nadu (IN)

(72) Inventors: Sujith Lal, Tamil Nadu (IN); Sudip Batabyal, Tamil Nadu (IN)

(73) Assignee: Amrita Vishwa Vidyapeetham (IN)

( * ) Notice: Subject to any disclaimer, the term of this patent is extended or adjusted under 35 U.S.C. 154(b) by 464 days.

(21) Appl. No.: 18/311,596

(22) Filed: May 3, 2023

(65) Prior Publication Data

US 2024/0140828 A1 May 2, 2024

(30) Foreign Application Priority Data

Oct. 26, 2022 (IN) .............................. 202241061033

(51) Int. Cl.
*C02F 1/14* (2023.01)
*B01D 1/00* (2006.01)
(Continued)

(52) U.S. Cl.
CPC .............. *C02F 1/14* (2013.01); *B01D 1/0035* (2013.01); *B01D 3/02* (2013.01); *B01D 5/006* (2013.01); *C02F 2103/08* (2013.01)

(58) Field of Classification Search
CPC ...... C02F 1/14; C02F 1/04–18; B01D 1/0035; B01D 3/02; B01D 5/006; B01D 5/0063;
(Continued)

(56) References Cited

U.S. PATENT DOCUMENTS 1,999,499 A * 4/1935 Burgess ................... B01J 20/20
502/413
2,439,538 A * 4/1948 Burgess ................... B01J 20/10
502/413
(Continued)

FOREIGN PATENT DOCUMENTS

CN 101941821 A * 1/2011 ............. C04B 28/02
CN 114644375 A * 6/2022 ............. C02F 1/045

OTHER PUBLICATIONS

Yin et al., "Femtosecond laser induced robust Ti foam based evaporator for efficient solar desalination," Journal of Materials Chemistry A, 2019, 7, 8361, DOI: 10. 1039/c9ta00291j.*
(Continued)

*Primary Examiner* — Jonathan Luke Pilcher
(74) *Attorney, Agent, or Firm* — Donald R. Boys; Central Coast Patent Agengy LLC

(57) ABSTRACT

The disclosure provides a solar evaporation substrate for recovering water from a solution. The substrate includes a porous support and an activated carbon-cement composite. The disclosure also provides a solar thermal evaporation apparatus based on a novel substrate. The apparatus includes an open tray, a solution, a solar evaporation substrate, an enclosure and a plurality of collectors. The disclosure further provides a method for preparing the substrate from activated carbon-cement composite coated porous support and that is used to heat the solution by harvesting solar energy. The apparatus and method is chemical free, cost effective and gives a high evaporation rate of 2.4 kg/m² h under one-sun illumination with zero carbon footprint.

13 Claims, 5 Drawing Sheets

(51) Int. Cl.
    *B01D 3/02*        (2006.01)
    *B01D 5/00*        (2006.01)
    *C02F 103/08*      (2006.01)

(58) Field of Classification Search
    CPC .... B01D 5/0066; F24S 70/16; F24S 2080/012
    See application file for complete search history.

(56)           References Cited

U.S. PATENT DOCUMENTS

| | | | |
|---|---|---|---|
| 3,159,554 A * | 12/1964 | Mount | C02F 1/14 |
| | | | 159/DIG. 42 |
| 3,501,381 A * | 3/1970 | William | B01D 1/0005 |
| | | | 202/83 |
| 11,186,497 B2 * | 11/2021 | Wang | B01D 1/22 |
| 11,312,640 B2 * | 4/2022 | Wang | B01D 5/0015 |
| 11,440,214 B2 * | 9/2022 | Hu | H01M 10/052 |
| 2020/0255303 A1 * | 8/2020 | Wang | C02F 1/08 |
| 2020/0354233 A1 * | 11/2020 | Wang | C02F 1/14 |
| 2021/0047203 A1 * | 2/2021 | Wang | B01D 1/22 |

OTHER PUBLICATIONS

Espacenet Translation of CN 114644375 A.*
PE2E translation of CN 101941821 A.*
Sujith Lal, Sudip K. Batabyal, Activated carbon-cement composite coated polyurethane foam as a cost-efficient solar steam generator, Journal of Cleaner Production, vol. 379, Part 1, 2022, 134302, ISSN 0959-6526, https://doi.org/10.1016/j.jclepro.2022.134302.*
Yunsong Pang, Jiajia Zhang, Ruimin Ma, Zhiguo Qu, Eungkyu Lee, and Tengfei Luo, "Solar-Thermal Water Evaporation: A Review" ACS Energy Letters 2020 5 (2), 437-456, DOI: 10.1021/acsenergylett.9b02611.*

* cited by examiner

100

300

1

ACTIVATED CARBON-CEMENT COMPOSITE COATED POLYURETHANE FOAM BASED SOLAR THERMAL EVAPORATOR

CROSS REFERENCE TO RELATED DOCUMENTS

The present invention claims priority to Indian application 202241061033 Filed Oct. 26, 2022. All disclosure of the parent application is incorporated at least by reference.

FIELD OF THE INVENTION

The present invention generally relates to solar vapour generation and more particularly relates to hybrid material based solar device for solar vapour generation and methods thereof.

BACKGROUND OF THE RELATED ART

Solar-thermal water evaporation has drawn a lot of attention recently as an emerging green strategy that may potentially address exacerbating water scarcity. Applications in water boiling for electricity generation, water desalination and sanitization, besides use of renewable energy, make solar-thermal water evaporation more appealing.

Conventional solar thermal evaporation (STE) devices consist of light absorber, substrate, and an insulator. Devices can be divided into three categories based on their designs: bottom heating, top heating, and bulk heating (Tao et al., 2018). In top surface heating devices, evaporation occurs at surface of the substrate which reduces the heat loss and leads to high evaporation rate and efficiency. Bio-based materials including corn (Sun et al., 2020), sugarcane (Liu et al., 2019), carrot (Long et al., 2019), wood (He et al., 2019), banana pseudo stem (Chandran et al., 2022) etc., are prevalently used in constructing such top surface heating devices. These, however, are complex to fabricate, lack durability and are prone to biofouling.

Hybrid materials may serve as both a substrate and an insulator if they float on the bulk water surface to achieve a good evaporation rate and efficiency. Hence, there has long been a need in the art for a solar evaporation substrate, device and method that uses hybrid material that is easy to fabricate, cost-effective and efficient in terms of evaporation rate and durability. In this regard, the device and technique for solar thermal evaporation according to the present invention substantially departs from the conventional concepts and designs of the prior art.

These and other advantages will be more readily understood by referring to the following detailed description disclosed hereinafter with reference to the accompanying drawing and which are generally applicable to other solar thermal evaporators to fulfill particular application illustrated hereinafter.

SUMMARY OF THE INVENTION

According to one embodiment of the present subject matter, a solar evaporation substrate for recovering water from a solution is disclosed. The evaporation substrate includes a porous support wherein the support is configured to imbibe and wick a solution to be purified. In one embodiment, the porous support is polyurethane foam. The evaporation substrate further includes an activated carbon-cement composite configured to absorb solar energy for evaporation. In various embodiments, the activated carbon-cement composite is coated at a predetermined thickness of 0.5-1 mm on an upper surface of the porous support. In various embodiments, the activated carbon-cement composite includes powdered activated carbon and cement at a ratio in the range 2:1-3:1.

In various embodiments, the evaporation substrate attains a maximum surface temperature of 62° C. under one sun illumination for 1 hour. In various embodiments, the substrate has a working life ranging from 2 to 8 months.

According to another embodiment of the present subject matter, a solar thermal evaporation apparatus for purification of an aqueous solution or separation of a solute therefrom, including the solar evaporation substrate is disclosed. In various embodiments, the solar thermal evaporation apparatus includes an open tray configured to hold a layer of substrate on the solution to be purified wherein the solution includes salt water, wastewater or impure water. In various embodiments, the apparatus includes an enclosure configured to cover the tray that allows the entry to solar energy to facilitate evaporation of the solution followed by condensation to form a condensate. The apparatus further includes a plurality of collectors that are attached to the enclosure and is configured to collect the condensate water.

In various embodiments, the enclosure includes a solar still that maintains a closed environment with ambient temperature for facilitating condensation within the housing. The enclosure further includes a condenser placed on the top of the solar still which enhances the rate of vaporization and condensation.

In various embodiments, the apparatus gives an evaporation rate of 2.4 Kg/m2 h or more under one-sun illumination and provides an increase in surface temperature of the substrate from 29.9° C. to 41.5° C. in one minute.

According to another embodiment of the present subject matter, a method of preparing a solar evaporation substrate for use in solar thermal evaporation is disclosed. The method involves mixing finely powdered activated carbon in cement to form a mixture wherein mixing comprises mixing finely powdered activated carbon and cement at a ratio of 2:1-3:1. The method includes adding double distilled water to the mixture to prepare a paste of activated carbon-cement composite. The method further includes providing pre-treated polyurethane foam wherein providing pre-treated polyurethane foam comprises washing with distilled water followed by drying for 2 hrs at 55° C. Further, the method involves layering the paste of activated carbon-cement composite on the upper surface of pre-treated foam to a predetermined thickness. Next, the method involves drying the activated carbon-cement composite coated polyurethane foam at 60° C. for 10 hours.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

Figure 1:
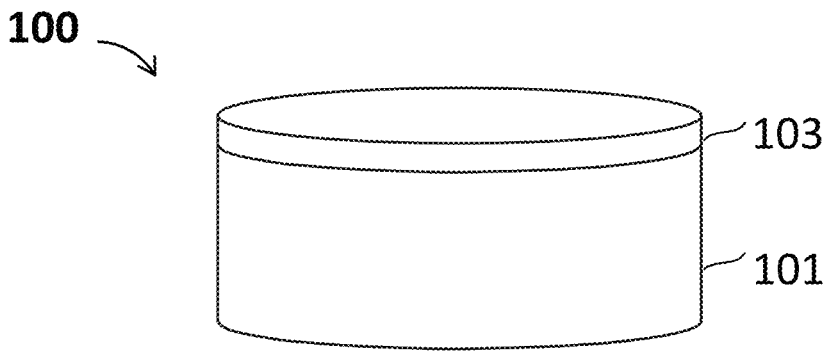
FIG. 1: is a schematic representation of a solar evaporation substrate for recovering water.

While the invention has been disclosed with reference to certain embodiments, it will be understood by those skilled in the art that various changes may be made, and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present disclosure provides a solar evaporation substrate. The present disclosure further provides for a solar evaporation apparatus for purification of an aqueous solution based on the novel solar evaporation substrate. The apparatus includes the substrate that may be used to heat a solution by harvesting solar energy. Also, a process for preparing the substrate is disclosed.

In various embodiments, the invention includes a solar evaporation substrate 100 for recovering water from a solution. The substrate 100 as shown in FIG. 1 includes a porous support 101 and an activated carbon-cement composite 103. In various embodiments, the porous support 101 may be configured to imbibe and wick a solution to be purified. In various embodiments, the porous substrate may have a thickness in the range of 10-25 mm. In one embodiment, the porous support may be a polyurethane foam. In various embodiments, the activated carbon-cement composite 103 may be configured to absorb solar energy for evaporation. In one embodiment, the activated carbon used for making composite may be finely powdered activated carbon. In various embodiments, the activated carbon-cement composite 103 may include powdered activated carbon and cement at a ratio in the range 2:1-3:1. In various embodiments, the activated carbon-cement composite 103 is coated on an upper surface of the porous support 101. In various embodiments, the activated carbon-cement composite 103 may be coated on an upper surface of the porous support at a predetermined thickness of 0.5-1 mm to form the substrate 100. In one embodiment, the fabricated substrate 100 may attain a maximum surface temperature of 62° C. under one sun illumination for 1 hour. In various embodiments, the substrate 100 may have a working life ranging from 1 to 8 months.

Figure 2:
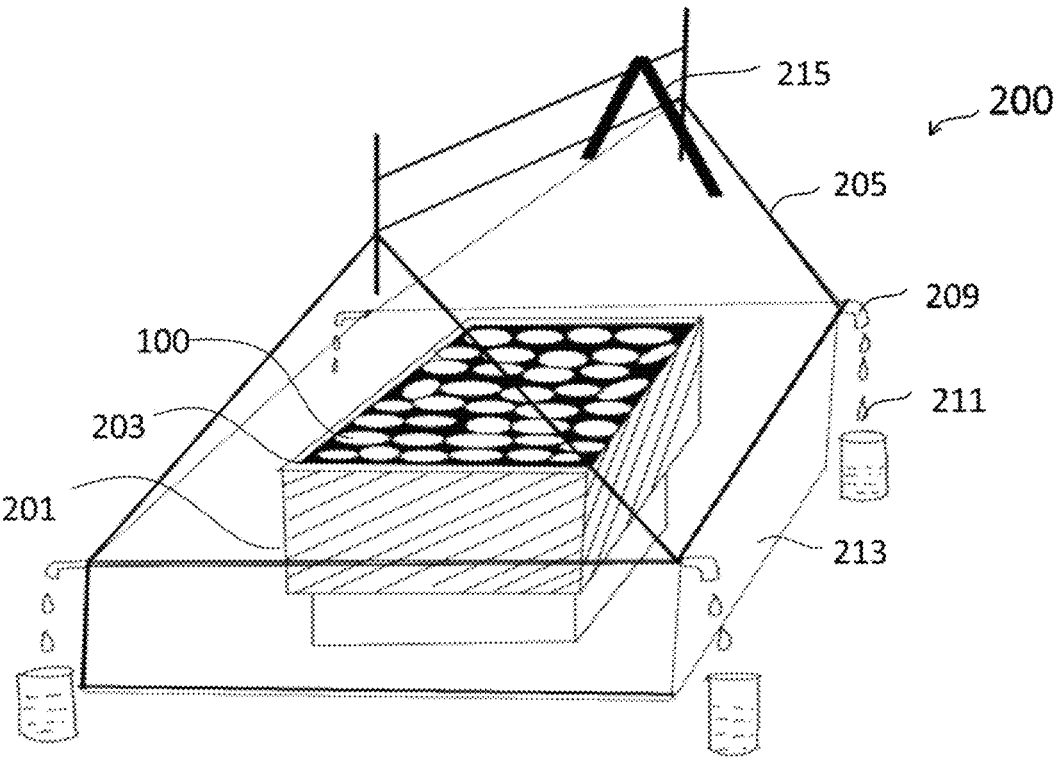
FIG. 2: is a schematic representation of solar thermal evaporation apparatus for purification of an aqueous solution including the solar evaporation substrate.

In various embodiments, the invention includes a solar thermal evaporation apparatus 200 for purification of an aqueous solution. In various embodiments, the apparatus 200 of the present invention may operate on the principle of an evaporation and condensation system. In various embodiments, the apparatus 200 includes the solar evaporation substrate 100. In various embodiments, the apparatus 200 may be part of equipment used for separating a solute from the aqueous solution. In some embodiments, the separation equipment may be used to make salt from seawater or brackish water. In various embodiments, the apparatus 200 as shown in FIG. 2, may be an integral assembly having a number of components such as an open tray 201, a layer of substrate 100, an enclosure 205 and a plurality of collectors 209. In various embodiments, the apparatus 200 encloses all the above components with the enclosure and may help in enhancing evaporation and condensation process. The apparatus 200 may be compact, portable and may have a minimal operation cost with no complex instrumentation involved.

In various embodiments, the open tray 201 may have a conventional three-dimensional shape with a volumetric capacity to hold the solution 203 to be purified. The open tray 201 may be a hollow storage space with an open-top and may be configured to carry a layer of substrate 100. In an embodiment, the open tray 201 may be composed of a leak proof and water-resistant material such as polyethylene or any water resistant material with an ability to resist corrosion.

In various embodiments, the solution 203 may include any fluid with a viscosity equivalent to that of water or any fluid which may have similar chemical properties as that of water and may include salt water, wastewater or impure water. The solution 203 may be heated through the solar thermal evaporation apparatus 200.

In various embodiments, the solar evaporation substrate 100 may be placed as a layer on the top of the solution 203 in the open tray 201 as shown in FIG. 2. The substrate 100 is configured to imbibe and wick the solution 203 held by the open tray 201. In another embodiment, the substrate 100 may be a porous material formed of activated carbon-cement composite coated polyurethane foam which makes it float on the solution 203. The substrate is a photon absorbing three-dimensional structure that absorbs solar energy for vaporization. The substrate 100 may be arranged such that it imbibes and wicks the solution and upon exposing to the solar energy leads to evaporation of the solution 203. In some embodiments, the substrate increases the rate of evaporation of the solution.

In various embodiments, the apparatus 200 for solar thermal evaporation may include an enclosure 205 as shown in FIG. 2. The open tray 201 carrying the solution 203 and the substrate 100 are encased inside the enclosure 203. In some embodiments, the enclosure 203 may be made up of a transparent material and may include but not limited to acrylic material so as to transmit light of wide wavelength.

The enclosure 203 may include a solar still 213 and a condenser 215. In an embodiment, the solar still 213 may provide a closed environment thereby maintaining an ambient temperature within the apparatus 200 to facilitate condensation within the enclosure. The solar still may be in the shape of a ridge tent or cone or any other shape suitable to receive solar radiation irrespective of the sun's position in the sky. The entry of solar energy facilitates evaporation of the solution 203 wicked by the substrate 100. In another embodiment, the condenser 215 may be placed on the top of the solar still 213. The condenser is configured to enhance the rate of condensation of the vapours generated by evaporation of the solution 203 forming condensate water 211.

In various embodiments, the plurality of collectors 209 may include a plurality of tubes connected on the external surface of the enclosure 205. These tubes allow maximum collection of condensate water 211. In an embodiment, the tubes may be made from leak proof and water-resistant material such as polyethylene.

In various embodiments, the apparatus 200 may provide a high water evaporation rate. In one embodiment, the apparatus 200 may give a high water evaporation rate of 2.4 kg/m²h or more under one-sun illumination. In various embodiments, the apparatus 200 may provide an increase in surface temperature of the substrate from 29.9° C. to 41.5° C. in one minute.

Figure 3:
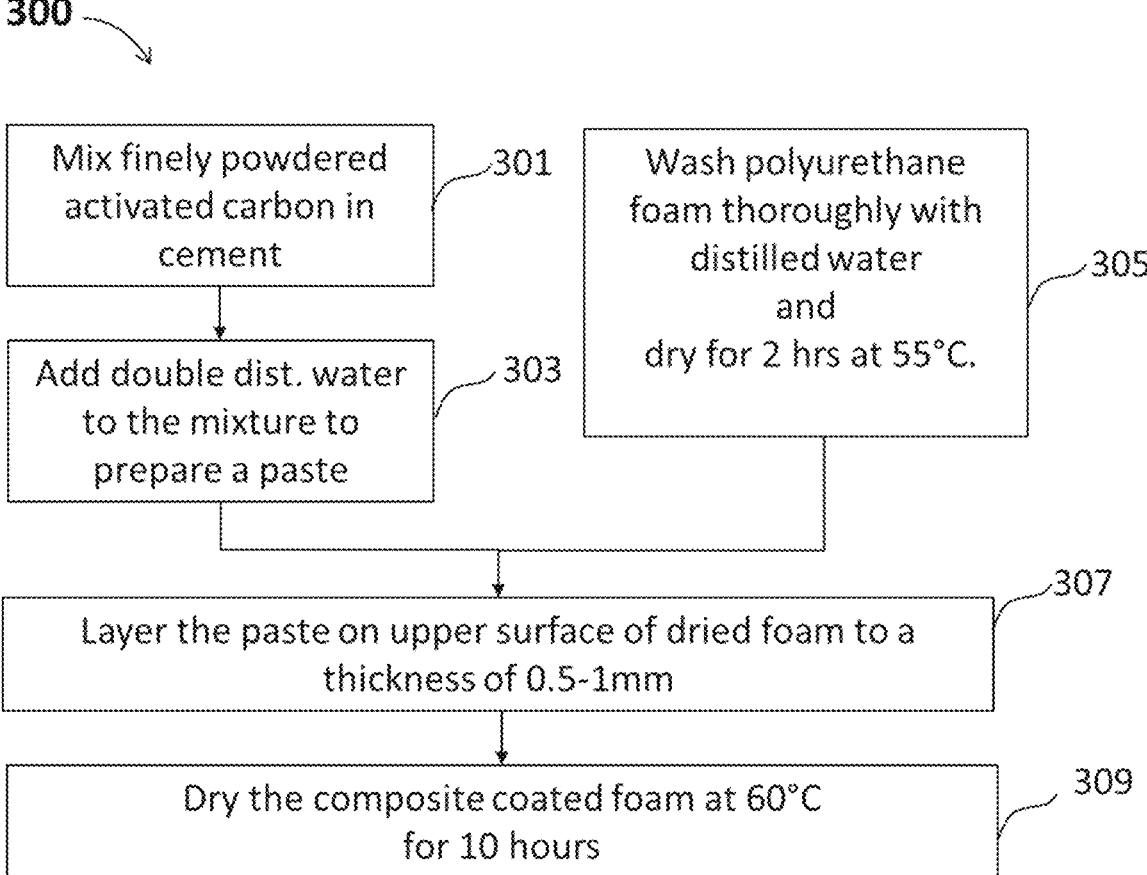
FIG. 3: represents a method of synthesis of solar evaporation substrate.

The invention in various embodiments includes a method for preparation of the solar evaporation substrate 300 for use in solar thermal evaporation. The method involves mixing finely powdered activated carbon in cement in step 301 of the process as shown in FIG. 3. In some embodiments, the mixing comprises mixing finely powdered activated carbon and cement at a ratio of 2:1-3:1. In step 303, double distilled water is added to the mixture to prepare a paste of activated carbon-cement composite. In step 305, pre-treated polyurethane foam was provided. In some embodiments, the pre-treated polyurethane foam may be prepared by washing the foam several times with distilled water. In some embodiments, the washed polyurethane foam may be dried for 2 hours at 55° C. In step 307, paste of activated carbon-cement composite is layered on the upper surface of pre-treated polyurethane foam to a pre-determined thickness. In some embodiments, the pre-determined thickness of the paste layered may range from 0.5-1 mm. Drying of activated carbon-cement composite coated polyurethane foam takes place at 60° C. for 10 hours in step 309, to get the substrate with pre-determined characteristics. The pre-determined characteristics of the substrate may include thickness, colour, porosity, absorption capacity, service-life and productivity of the substrate.

In various embodiments, the mixing finely powdered activated carbon in cement in step 301 of the process in a ratio of 2:1-3:1 may impact porosity, light absorption and stability of the substrate. In various embodiments, addition of double distilled water in step 303 may enhance holding property of the cement to the activated carbon. This ratio may further augment light absorbing property of the substrate and increases the rate of evaporation of the solution when enclosed in the enclosure and exposed to the solar energy. Addition of water in step 303 may further impact carbon excretion from the substrate.

In various embodiments, the solar evaporation substrate 100 of the present invention is durable, low cost and chemical free. The substrate exhibits a high solar light absorbance and transport capabilities in water to maximize the heat localization. In some embodiments, the stability and adhesive strength of the substrate was confirmed for 60 days of water treatment. Further, in various embodiments, the apparatus 200 of the present invention is a low cost, chemical free, easy to fabricate and highly efficient solar thermal evaporation device. In some embodiments, the apparatus of the present invention is a scalable water desalination system and has been used for removal of dust and dye from waste water. In some embodiments, no carbon was excreted from the apparatus even after 60 days of the experiment. In various embodiments, present disclosure provided the method of preparation of the solar evaporation substrate 300 for use in solar thermal evaporation. This method has been experimentally validated and has demonstrated production of an extremely low-cost porous substrate having high vaporization efficiency.

EXAMPLES

Example—1: Fabrication of Solar Evaporator Substrate

Pure fine cement powder was purchased from local cement vendor in Coimbatore and used for this study. Activated carbon was bought from Chemtex Specialty Limited. Waste polyurethane foam was collected from local market in Coimbatore. Solar evaporation substrates with varying proportions of activated carbon, cement and water were fabricated and these sample substrates were named as CCPF-I, CCPF-II, CCPF-III, CCPF-IV and CCPF-V. Details of these samples have been listed in the Table—1.

Table—1: Showing Various Ratios of Activated Carbon-Cement Composite Coated Polyurethane Substrates.

| Name | Cement | Activated Carbon | DI |
|---|---|---|---|
| CCPF-I | 2.33 g | 1 g | 2 ml |
| CCPF-II | 2 g | 1 g | 3 ml |
| CCPF-III | 2 g | 1.5 g | 3 ml |
| CCPF-IV | 2.5 g | 1 g | 3 ml |
| CCPF-V | 2.33 g | 1.5 g | 3 ml |

When binding properties of the activated carbon, cement and water was analysed, it was observed that CCPF-IV was workable for further experiments and hence was characterized further. In case of CCPF-IV, to prepare a composite coating, 2.5 g of cement, 1 g of fine powdered activated carbon were mixed, and 3 ml of double distilled water were slowly added to form cement/carbon composite paste by mixing. Polyurethane (PU) foam cut into pieces of 3 cm diameter area was taken and washed several times with double distilled water. PU foam was washed to remove the impurities to ensure opening of pathways of micro channels. The PU foam was further dried for 2 hours at the temperature of 55° C. The composite paste was coated as a thin layer (1 mm) on the foam using spatula and was allowed to dry at 60° C. for 10 hours, until desired char dark colour was obtained. The coated surface of foam was immersed several times in double distilled water to remove unbound particles from the top surface.

Example-2: Light Capturing Ability of Fabricated Substrate

To analyse light capturing ability of the sample, UV-Vis-NIR reflectance study was carried out using Shimadzu UV-2600 instrument. The reflectance of the CCPF-IV showed less than 1% scattering directly explaining less light absorbance capacity due to presence of carbon and cement. The porous nature of solid-air interface lead to a reflectance of 0.5%. A slight increase in reflectance was observed when there was shift from visible to IR, further confirming the wide range wavelength absorbing performance.

Example-3: Porosity Determination of Fabricated Substrate

To confirm the availability of pores on top surface of activated carbon-cement (C/C) composite absorber coated over polyurethane foam for better water reach at interface, an impregnation test was performed to correlate the existence of pores after the C/C mixture coating. A single water droplet was allowed to be suspended on the interface. It was observed that the water droplet on CCPF-IV disappeared immediately in less than 1 second. This indicated superhydrophilicity due to high number of pores after the cement substrate coating treatment. It was further observed that during the suspension of single water droplet on CCPF-IV surface, contact angle of solid-liquid interface was 160°. The spherical water droplet suddenly disappeared within 0.2 seconds showing the extraordinary wetting ability with the contact angle of 12°. Hence, the super hydrophilic surface of the fabricated substrate ensured wettability for high water evaporation.

Example-4: Purification Efficiency of Fabricated Substrate

To identify purification ability of the fabricated solar evaporator substrate, the substrate CCPF-IV was soaked under Rhodamine-b dye solution, salt solutions like $MgSO_4$, NaCl, $MgCl_2$ and mud dissolved solution. Rhodamine-b dye solution was prepared by mixing 2 gm of Rhodamine-b in 80 ml of distilled (DI) water. $MgSO_4$ dissolved solution was prepared by mixing 20% of $MgSO_4$ with DI water. Similarly, NaCl and $MgCl_2$ solutions were prepared by mixing 4% NaCl, 4% $MgCl_2$ in DI water, respectively. Further, the efficiency of substrate was also tested with highly concentrated salt solution (32 g NaCl: 80 ml DI). Mud dissolved solution was prepared by mixing 4 gm of mud in 90 ml of DI water. Potable water was used as standard. Soaking was followed by evaporation and condensation of both the solutions. Ultraviolet-visible (UV-VIS) spectroscopy analysis was performed, with Jasco V-750 spectrophotometer, to confirm the purity of both the solutions, before and after condensation. The UV-VIS results of the pure and condensed solution of the above-mentioned liquid solutions were compared. During the UV-VIS analysis, minimum absorbance was observed in the condensate solution. This indicated that the fabricated porous substrate possessed a high desalination capacity along with dye and dirt removal ability.

Example—5: Effect of Illumination on Efficiency of Fabricated Substrate

Figure 4:
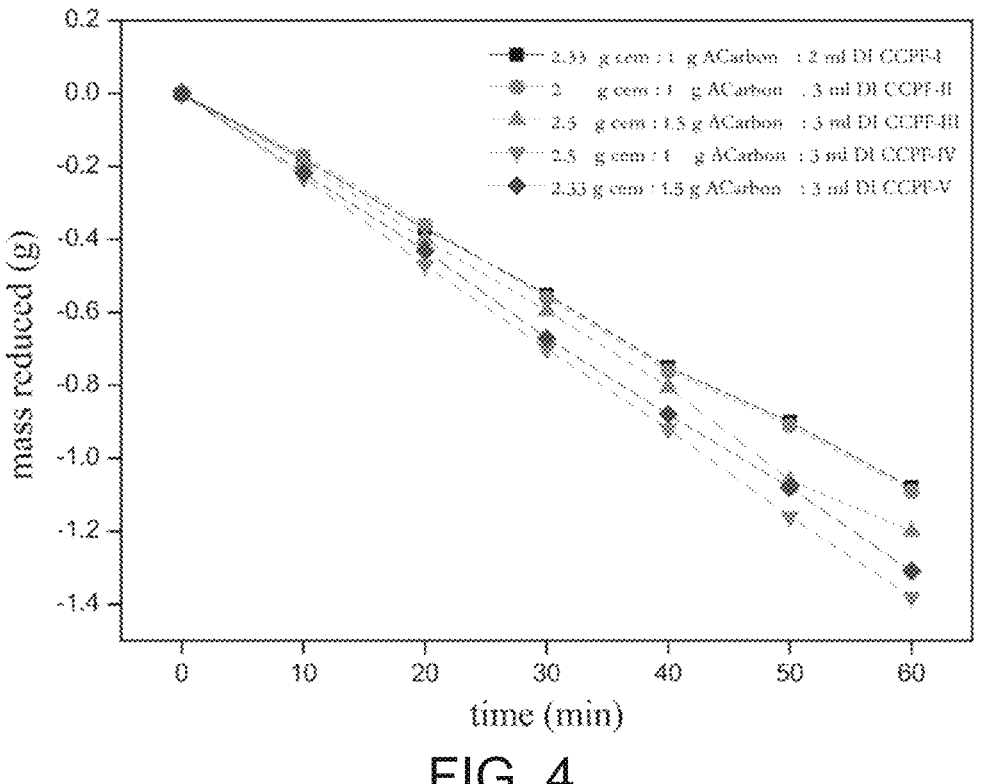
FIG. 4: is a graphical representation of weight reduction of solar evaporation substrates (CCPF-I-CCPF-V)

Efficiency of fabricated substrates was evaluated. During this experiment, mass reduction of water by various CCPF evaporators (CCPF-I to CCPF-V) under one-sun illumination was considered. The FIG. 4 shows mass reduction of water with CCPF-I to CCPF-V having different ratio of activated carbon-cement-water. Least mass reduction was observed in CCPF-I and CCPF-II. CCPF-IV showed high mass reduction compared to other samples. Under one sun illumination, CCPF-IV showed 1.4 g of water reduction over one hour.

Example—6: Evaporation Efficiency of Fabricated Substrate

Figure 5:
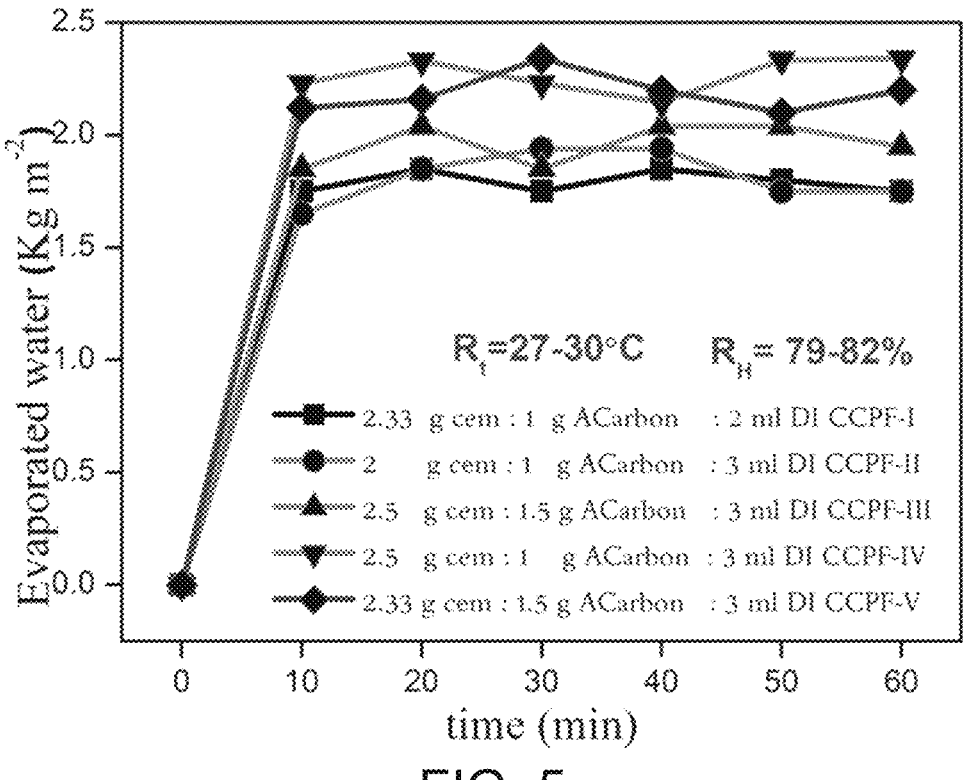
FIG. 5: is a graphical representation of evaporation rate of solar evaporation substrates (CCPF-I-CCPF-V) under one sun illumination at 27-30° C. room temperature (RT) and relative humidity (RH) of 79-82%.

Effect of different ratio of activated carbon-cement-water of the composite on evaporation rate of the fabricated substrates was evaluated. Further, for this experiment, substrates CCPF-I to CCPF-V were placed over water surface under one sun illumination at the room temperature (Rt) of 27-30° C. and relative humidity (RH) of 79-82%. The humidity and the room temperature were measured using Thermopro indoor monitor (TP-50). Respective water evaporation rate was recorded and illustrated in FIG. 5. It was observed that CCPF-IV gave highest evaporation rate of 2.4 Kg m$^{-2}$h$^{-1}$ owing to its high absorption of light and huge number of water pathways through its membrane. It was observed that the presence of activated carbon in the top surface provided absorption of wide wavelength spectrum of incident radiation allowing minimum reflection to the environment whereas the cement played a key role of binding the activated carbon and polyurethane foam together.

Example—7: Surface Temperature Analysis

Figure 6:
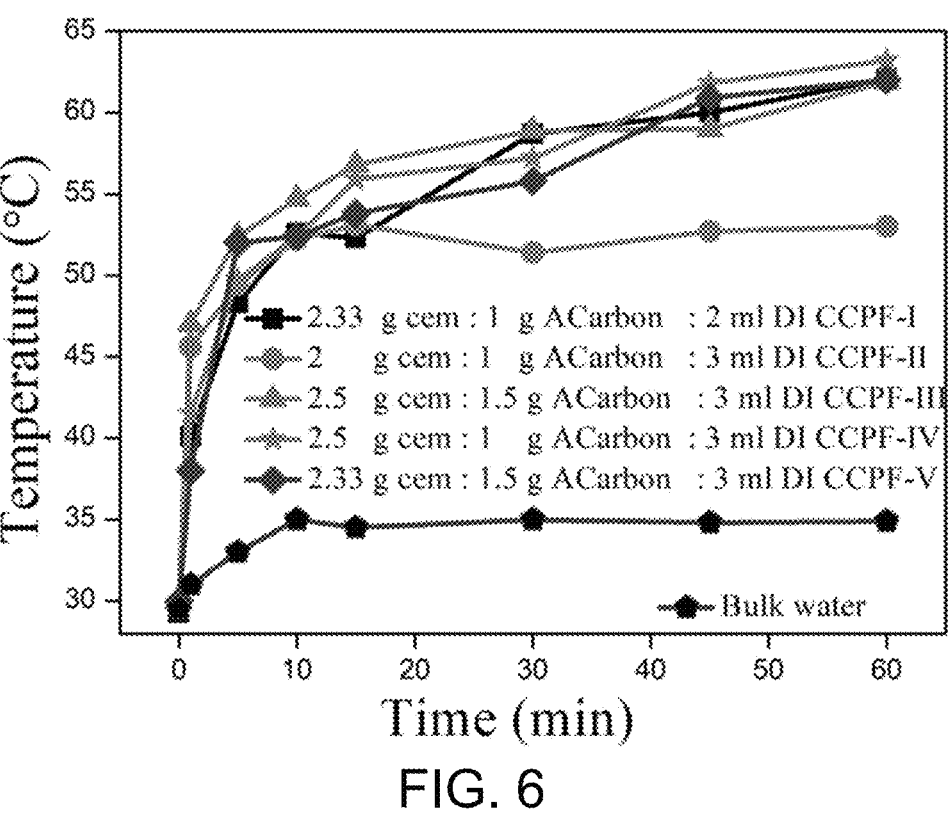
FIG. 6: is a graphical representation of temperature variation of solar evaporation substrates (CCPF-I-CCPF-V) under one sun illumination.

Thermal absorbing behaviour of CCPF was carried out. During the experiment, a solar simulator (Abet) was used as a source of artificial solar light and a Fluke TiS20 Infrared Camera was used to measure surface temperature of the substrates fabricated with varying proportions of activated carbon-cement and water (CCPF-I to CCPF-V). FIG. 6 graphically represents the thermal absorbing behaviour of fabricated substrates. The CCPF-I, III, IV and V attained the maximum temperature of 60-63° C. under 1 sun illumination. It was observed that the accumulation of high surface temperature was due to the broad absorbance range of activated carbon and cement. Besides, for CCPF-IV, a drastic increase in temperature was from 29.9° C. to 41.5° C. within 1 min under one-sun illumination indicating strong property of energy absorption-conversion.

Example—8: Construction of Solar Thermal Evaporator Using Solar Evaporator Substrate A solar thermal evaporator using fabricated substrate was constructed to analyse its evaporation efficiency. A plastic basket having dimensions–height=6 cm, length=15 cm, breadth=15 cm was used to hold a layer of activated carbon-cement composite coated polyurethane foam substrate. The plastic basket was filled with water. 20-23 pieces of fabricated substrate having a thickness of 10-25 mm and radius of 3 cm were placed and allowed to float on water in plastic basket. A ridge tent shaped solar still with an area of 30×30 cm² was constructed using acrylic transparent sheet and was placed as top cover on the plastic basket for condensing the evaporated water. Acrylic sheet was used due to its light transmittance of wide wavelength of sunlight (from 250 to 2500 nm). Further, a condensation enhancer was attached to enhance the water output to the beaker. Two beakers of 200 ml were attached on either side of the solar still to collect the condensed water.

Figure 7:
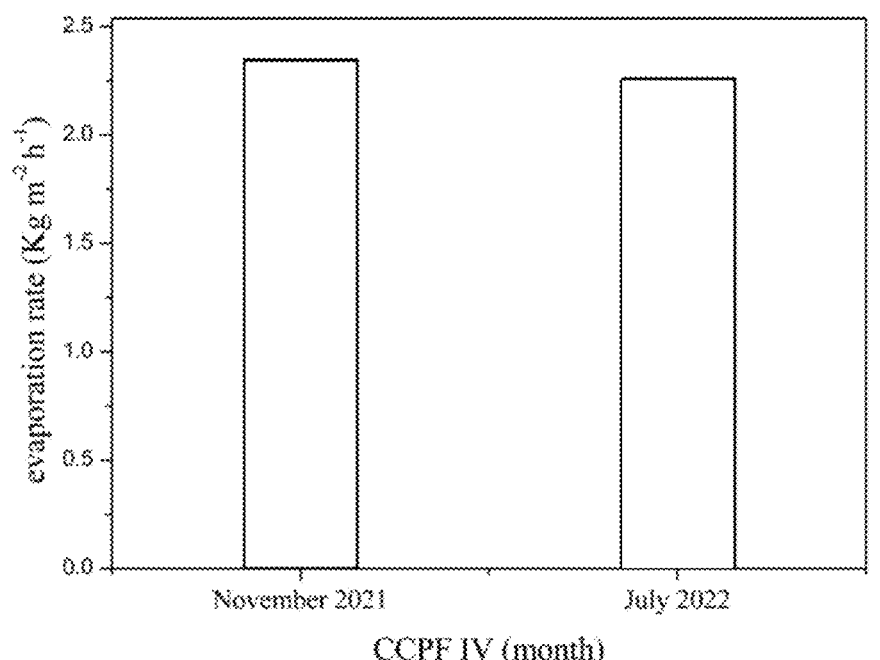
FIG. 7: is a graphical representation of the stability of the apparatus including solar evaporation substrate after 8 months.

Example—9: Durability of Fabricated Substrate and Stability Test of Apparatus The adhesive ability of the cement with polyurethane foam was investigated by dipping the evaporative surface into water for a day. No carbon material was detected in the water or excreted from the polyurethane surface confirming adequate binding of the cement to the foam. Further, the binding strength of activated carbon-cement composite was tested by applying pressure on the wet CCPF surface with tissue to check the carbon excretion from the foam. No presence of carbon was found attached with tissue confirming strong stacking behaviour of cement with polyurethane foam and enhancing recyclability and durability of the substrate. Binding strength of the sample substrate was observed for further 60 days. After 8 months of observation, the sample substrate was found to be stable and was providing the same evaporation rate. The weight reduction data of solar thermal evaporator constructed using CCPF-IV after 8 months showing the same evaporation rate are graphically represented in FIG. 7.

Figure 8:
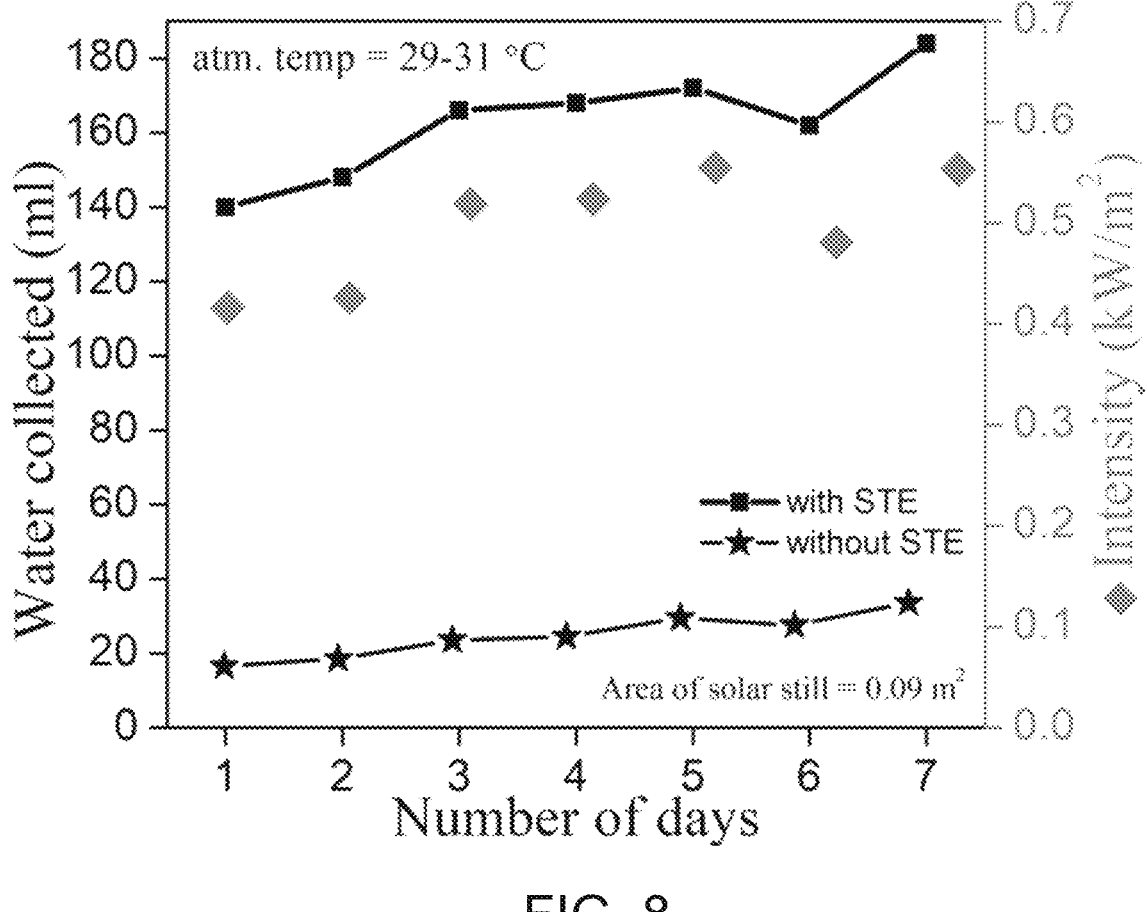
FIG. 8: represents the productivity of the apparatus including solar evaporation substrate in outdoor conditions.

Example—10: Outdoor Performance of Activated Carbon-Cement-Polyurethane Foam Based Solar Thermal Evaporator The prepared solar thermal evaporator was tested for its outdoor performance and was kept for 4 hours of sunlight exposure with 30×30 cm$^2$ area surface area of fabricated substrate. The corresponding incident solar radiation was measured using Fluke lux meter. The maximum incident radiation was recorded to be 0.6 kW/m2 and the minimum was 400 W/m2. The variation in the intensity was due to the variation in the incoming direct sunlight. 140-160 ml ultra-pure water was collected from the evaporator under <0.6 kW/m$^2$ varying solar intensity (environment temperature 30-32° C./cloudy day) in 4-5 hours. FIG. 8 shows the productivity of the CCPF based evaporator in outdoor condition. From this data, it is predicted that, a large set-up with a container area of 1 m2 can provide 5 litres of fresh water in 8 hours of 1 sun illumination (>5 lit/m2). Therefore, the 2D CCPFs enable high evaporation rate, which is very beneficial for practical application.

Example—11: Comparison of Solar Evaporation Substrate Based Evaporator with Other Evaporators To analyse the solar thermal evaporation efficiency of fabricated substrate, evaporation rate of the fabricated substrate of the present invention was compared with other reported evaporators. This simple w cost evaporator gave its best evaporation rate of 2.4 Kg m$^{-2}$ h$^{-1}$ under 1 sun illumination. Details of the same have been given in Table 2.

TABLE 2

Comparison of Captured Evaporation Rate with Other References

| Ref No. | Details of reference: Title (Link to reference) | Evaporation rate (kg m$^{-2}$ h$^{-1}$) | Solar Flux |
|---|---|---|---|
| 1 | This work | 2.4 | 1 |
| 2 | Li et al., 2020, https://doi.org/10.1021/acsami.0c06836 | 2.1 | 1 |
| 3 | et al., 2020, https://doi.org/10.1021/acsomega.9b03973. | 1.25 | 1 |
| 4 | Jang et al., 2019, https://doi.org/10.1002/gch2.201900003 | 6.6 | 3 |
| 5 | Cheng et al., 2019, https://doi.org/10.1016/j.solmat.2019.110127 | 1.66 | 1 |
| 6 | Li et al., 2018, https://doi.org/10.1021/acsami.7b18071 | 1.22 | 1 |

We claim:

1. A solar evaporation substrate for recovering water from a solution, comprising:
   a porous support of polyurethane foam of thickness 10-25 mm, configured to imbibe and wick a solution to be purified; and
   an activated carbon-cement composite configured to absorb solar energy for evaporation;

wherein the activated carbon-cement composite is coated at a predetermined thickness of 0.5-1 mm on an upper surface of the porous support.

2. The substrate as claimed in claim 1, wherein the activated carbon-cement composite includes powdered activated carbon and cement at a ratio in the range 2:1-3:1.

3. The substrate as claimed in claim 1, wherein the substrate attains a maximum surface temperature of 62° C. under one sun illumination for 1 hour.

4. The substrate as claimed in claim 1, wherein the substrate has a working life ranging from 2 to 8 months.

5. A solar thermal evaporation apparatus for purification of an aqueous solution or separation of a solute therefrom, including the solar evaporation substrate as claimed in claim 1, further comprising:
   an open tray configured to hold a layer of the solar evaporation substrate on the solution;
   an enclosure configured to cover the tray, wherein the enclosure admits solar energy to facilitate evaporation of the solution followed by condensation to form a condensate; and
   a plurality of collectors attached to the enclosure and configured to collect the condensate.

6. The apparatus as claimed in claim 5, wherein the solution comprises salt water, wastewater or impure water.

7. The apparatus as claimed in claim 5, wherein the enclosure comprises a solar still configured to maintain a closed environment with an ambient temperature for facilitating condensation within the enclosure.

8. The apparatus as claimed in claim 7, wherein the enclosure comprises a condenser placed on a top of the solar still and configured to enhance a rate of vaporization and condensation.

9. The apparatus as claimed in claim 5, wherein the apparatus provides an evaporation rate of 2.4 Kg/m$^2$h or more under one-sun illumination.

10. The apparatus as claimed in claim 5, wherein the apparatus provides an increase in surface temperature of the substrate from 29.9 C to 41.° C. in one minute under one-sun illumination.

11. A method for preparing a solar evaporation substrate for use in solar thermal evaporation, the method comprising steps of:
   mixing powdered activated carbon in cement to form a mixture;
   adding double distilled water to the mixture to prepare a paste of activated carbon-cement composite;
   providing pre-treated polyurethane foam;
   layering the paste on an upper surface of the pre-treated foam to a predetermined thickness, forming a composite structure;
   drying the composite structure at 60° C. for 10 hours.

12. The method as claimed in claim 11, wherein the mixing comprises mixing the powdered activated carbon and cement at a ratio of 2:1-3:1.

13. The method as claimed in claim 11, wherein providing the pre-treated polyurethane foam comprises washing the pre-treated polyurethane foam with distilled water followed by drying for 2 hrs at 55° C.

* * * * *